United States Patent Office 3,432,550
Patented Mar. 11, 1969

3,432,550
3,4,5-TRIMETHOXYBENZOYLGUANIDINES
Aldo Garzin, Milan, Italy, assignor to Istituto Chemioterapico Italiano S.p.A., Milan, Italy, a corporation of Italy
No Drawing. Filed May 23, 1966, Ser. No. 551,880
Int. Cl. C07c 103/22
U.S. Cl. 260—559     5 Claims

ABSTRACT OF THE DISCLOSURE

As compositions of matter guanidines of the formula

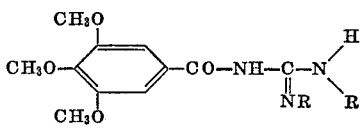

wherein R is ethyl or butyl and an acid addition salt thereof. Exemplary of the guanidines are 3,4,5-trimethoxybenzoyl-N,N'-diethyl guanidine and 3,4,5-trimethoxybenzoyl-N,N'-dibutyl guanidine. The compositions are useful as tranquilizers and sedatives for laboratory animals such as rats, mice, cats and dogs.

---

This invention relates to novel compositions of matter. In a particular aspect this invention relates to novel trimethoxybenzoyl guanidines of the formula

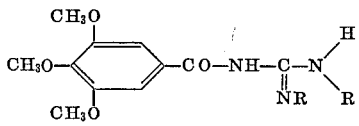

wherein R is an alkyl radical selected from the group consisting of ethyl and butyl and to their acid addition salts. In a further aspect this invention relates to a process for the preparation of the above trimethoxybenzoyl guanidines.

An object of the present invention is the provision of the novel trimethoxybenzoyl guanidines of the formula

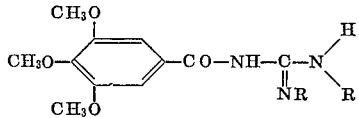

wherein R is defined as above. The trimethoxybenzoyl guanidines of the present invention are 3,4,5-trimethoxybenzoyl-N,N'-diethyl guanidine and 3,4,5-trimethoxybenzoyl-N,N'-dibutyl guanidine and their respective acid addition salts as illustrated by the hydrochlorides and the sulfates.

A further object of the present invention is the provision of a process for the production of novel trimethoxybenzoyl guanidines of the formula

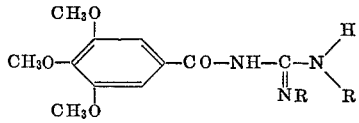

wherein R is defined as above.

Additional objects and advantages of the present invention will be obvious from the specification and the appended claims.

The novel compositions of the present invention are prepared by the condensation of a dialkyl-substituted guanidine of the formula

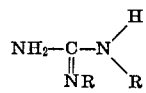

wherein R is defined as above with the methyl ester of 3,4,5-trimethoxybenzoic acid. The reaction may be represented as follows:

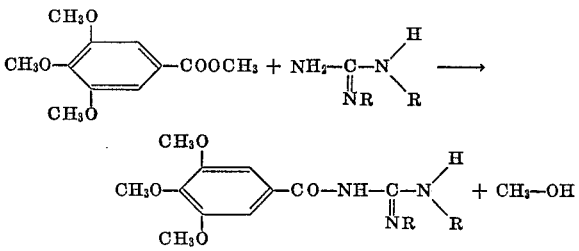

wherein R is defined as above. The reaction is preferably carried out in an inert solvent which will dissolve the reactants but which does not itself enter into undesirable side reactions. Dimethylformamide has been found to be particularly suitable but other useful solvents such as benzene, xylene and toluene may also be used.

The reaction is typically conducted at a temperature in the range of from about 100 to about 130° C. Temperatures below about 100° C. are generally not practical because of the slow rate of reaction while temperatures above 130° C. tend to cause decomposition of the reactants and reaction products.

The molecular proportions used in providing the novel trimethoxybenzoyl guanidines of the present invention can vary over a wide range. Typically, mole ratios of 3,4,5-trimethoxybenzoic acid methyl ester to dialkyl-substituted guanidine of about 5:1 to about 1:5 may be satisfactorily employed with mole ratios of approximately 1:1 being preferred.

The novel compositions of the present invention can be obtained as free base or in the form of their acid addition salts. Salts of the free base are prepared in the known manner with suitable acids as for example by treatment with hydrochloric acid or sulfuric acid. The salts can be converted into the free base in the known manner by treatment with an alkaline agent such as alkali metal hydroxide. The salts of the new compositions may also be used for purifying the free base; thus the free base is converted to its salt, the latter separated from the reaction medium and the free base then liberated from the salt.

The starting materials are known and may be prepared by known means. The 3,4,5-trimethoxybenzoic acid methyl ester is prepared by dissolving 3,4,5-trimethoxybenzoic acid in methanol and refluxing the resulting solution in the presence of an acidic condensation agent such as sulfuric acid. 3,4,5-trimethoxybenzoic acid may be prepared by the method described by Gilman in Organic Synthesis, vol. 1, page 522 (1932). The dialkyl-substituted guanidines are prepared by reacting a dialkyl-substituted guanidine salt with sodium methylate in the presence of a suitable solvent such as methanol. The dialkyl-substituted guanidine salt may be prepared by the method described in Beilstein, 3rd Supplement, vol. 4, page 219.

The new compositions of the present invention possess valuable pharmacological properties and are distinguished by their tranquilizing and sedative effect on valuable laboratory animals such as rats, mice, cats and dogs. They permit treatment of animals which would not be possible without the use of a tranquilizer or a sedative. For example, the compositions of this invention may be employed to induce sedation in animals and thereby permit implantation of tumerous tissue in the study of cancer. The new compositions may be used in the form of pharmaceutical preparations containing said compositions in conjunction with solid or liquid pharmaceutical vehicles suitable for enteral or parenteral administration. Suitable vehicles are substances that do not react with the compositions such as for example gelatin, lactose, starches, talc, vegetable oils, saline solutions or other known medical excipients. The pharmaceutical preparations may be for example tablets or capsules or in liquid injectable form such as solutions, suspensions or emulsions.

The invention will be understood more fully by reference to the following examples. It is to be understood however that the examples are for purposes of illustration only and are not intended as a limitation of the invention.

EXAMPLE 1

To a solution of 23 grams of sodium methylate in 500 cc. of methanol were added 196 grams of N,N'-diethyl guanidine hydrogen bromide. The whole is then heated with stirring to about 70° C. and maintained at that temperature for about 4 hours. The reaction mixture was then allowed to cool to room temperature and filtered to remove precipitated sodium bromate. The resulting filtrate was then slowly added to a solution of 226 grams of 3,4,5-trimethoxybenzoic acid methyl ester in 400 cc. of dimethylformamide. The resulting mixture was then distilled under reduced pressure for approximately 1 hour at about 75° C. to remove methanol. The distilled reaction mixture was then heated at atmospheric pressure to approximately 120° C. and maintained at that temperature for approximately 70 hours. At the end of the 70 hour period the reaction mixture was permitted to cool to room temperature and filtered to remove precipitated sodium bromate. To the filtrate was then added a methanol solution of hydrogen chloride. The resulting mixture was then concentrated by distillation under reduced pressure. The thus obtained concentrate was then mixed with ethyl acetate and the mixture was filtered. The thus obtained filter cake was then washed first with acetone and then with methanol and then dried at approximately 50° C. 3,4,5-trimethoxybenzoyl-N,N'-diethyl guanidine was obtained (M.P. 147° C.).

EXAMPLE 2

The process of Example 1 is repeated in all essential details with the exception that N,N'-dibutyl guanidine hydrogen bromide was substituted for N,N'-diethyl guanidine hydrobromide. 3,4,5-trimethoxybenzoyl-N,N'-dibutyl guanidine is obtained. 3,4,5-trimethoxybenzoyl-N,N'-dibutyl guanidine has a melting point of 132–135° C.

EXAMPLE 3

The sedative effect of the 3,4,5-trimethoxybenzoyl guanidines of the present invention was observed in animals to which they had been administered. The activity is illustrated by the test hereinafter described in which mature rats were used as experimental animals. Each animal was given a dosage of 50 milligrams of 3,4,5-trimethoxybenzoyl guanidine per kilogram of body weight. The dosages were administered orally in tablet form.

Administration of 3,4,5-trimethoxybenzoyl guanidine induced sleep in each animal. The duration of sleep of each animal was observed. The average duration of sleep of the test group of animals was then compared with the average duration of sleep of rats to which no sedative had been administered. The results are given in the table which follows. These results show that the duration of sleep of rats is prolonged by the administration of sedative dosages of the trimethoxybenzoyl guanidines of the present invention. From these results it is predictable that the trimethoxybenzoyl guanidines of the present invention would have sedative and tranquilizing effects on humans.

TABLE

| Composition | Average increase in duration of sleep as a percent greater than normal | No. of animals tested |
| --- | --- | --- |
| 3,4,5-trimethoxybenzoyl-N,N'-diethyl guanidine | 350 | 50 |
| 3,4,5-trimethoxybenzoyl-N,N'-dibutyl guanidine | 200 | 50 |
| None | Normal | 50 |

It will be appreciated that the dosage of 3,4,5-trimethoxybenzoyl guanidine required will vary depending among other things upon the particular composition selected, the species of animals to be treated and the individual animal's response to the drug. A single effective dosage will typically range from about 10 to about 300 milligrams per kilogram of animal body weight with the smaller dosages within the range typically producing a tranquilizing effect and the larger dosages within the range typically producing a sedative effect. Dosages in excess of about 1500 milligrams per kilogram of body weight have been found to be toxic and therefore should be avoided.

Since many embodiments can be made in this invention and since many changes may be made in the embodiments described, the foregoing is to be taken as illustrative only and the invention is defined by the claims appended hereto.

What is claimed is:

1. A composition matter having the formula

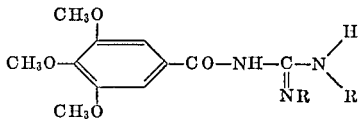

wherein R is a radical selected from the group consisting of ethyl and butyl and an acid addition salt thereof selected from the group consisting of the sulfate and the hydrochloride.

2. 3,4,5-trimethoxybenzoyl-N,N'-diethyl guanidine.

3. 3,4,5-trimethoxybenzoyl-N,N'-dibutyl guanidine.

4. 3,4,5-trimethoxybenzoyl - N,N' - diethyl guanidine hydrochloride.

5. 3,4,5-trimethoxybenzoyl - N,N' - dibutyl guanidine hydrochloride.

References Cited

Burmistron et al.: Zhur. Ob. sh. Khim., vol. 33, p. 1322–26 (1963).

HENRY R. JILES, *Primary Examiner.*

HARRY I. MOATZ, *Assistant Examiner.*

U.S. Cl. X.R.

167—65